(12) United States Patent
Moran et al.

(10) Patent No.: US 11,891,537 B2
(45) Date of Patent: Feb. 6, 2024

(54) TRIPHENYLPHOSPHINE-CONTAINING COATINGS WITH ENHANCED ADHESION TO UNPRIMED SURFACES

(71) Applicant: Sheboygan Paint Company, Sheboygan, WI (US)

(72) Inventors: Samantha Rose Moran, Rome, GA (US); Chandrakant Laxman Halli, Cedartown, GA (US)

(73) Assignee: Sheboygan Paint Company, Sheboygan, WI (US)

( * ) Notice: Subject to any disclaimer, the term of this patent is extended or adjusted under 35 U.S.C. 154(b) by 0 days.

(21) Appl. No.: 17/708,333

(22) Filed: Mar. 30, 2022

(65) Prior Publication Data

US 2022/0325110 A1  Oct. 13, 2022

Related U.S. Application Data

(60) Provisional application No. 63/168,550, filed on Mar. 31, 2021.

(51) Int. Cl.
| | | |
|---|---|---|
| *C09D 5/08* | (2006.01) | |
| *C09D 7/63* | (2018.01) | |
| *B05D 7/06* | (2006.01) | |
| *B05D 7/14* | (2006.01) | |

(Continued)

(52) U.S. Cl.
CPC ............... *C09D 5/08* (2013.01); *B05D 7/06* (2013.01); *B05D 7/14* (2013.01); *C09D 7/63* (2018.01); *C09D 133/08* (2013.01); *C09D 167/02* (2013.01); *B05D 2202/10* (2013.01); *B05D 2203/20* (2013.01)

(58) Field of Classification Search
CPC .......... C09D 5/08; C09D 7/63; C09D 133/08; C09D 167/02; B05D 7/06; B05D 7/14; B05D 2202/10; B05D 2203/20
See application file for complete search history.

(56) References Cited

U.S. PATENT DOCUMENTS

| | | |
|---|---|---|
| 5,169,979 A | 12/1992 | Kubillus et al. |
| 5,416,136 A | 5/1995 | Konzmann et al. |
| 5,453,449 A | 9/1995 | Drueke et al. |

(Continued)

FOREIGN PATENT DOCUMENTS

| | | | |
|---|---|---|---|
| JP | 61210192 A | 9/1986 | |
| WO | WO-2010030771 A1 * | 3/2010 | ......... C08G 18/6254 |

OTHER PUBLICATIONS

Gimbert, C., Lumbierres, M., Marchi, C., Moreno-Maas, M., Sebastin, R.M. and Vallribera, A., 2005. "Michael additions catalyzed by phosphines. An overlooked synthetic method". Tetrahedron, 61(36), pp. 8598-8605.

(Continued)

*Primary Examiner* — Robert S Walters, Jr.
(74) *Attorney, Agent, or Firm* — Fredrikson & Byron, P.A.

(57) ABSTRACT

A curable resin composition may include a component having two or more active methylene groups and/or active methine groups, a component having at least two α,β-unsaturated carbonyl groups, and a triphenylphosphine catalyst that promotes a Michael reaction between the other two components. The composition can be used to coat metal substrates and can exhibit particularly good performance characteristics when applied to unprimed, bare metal surfaces.

24 Claims, 12 Drawing Sheets

(51) Int. Cl.
*C09D 133/08* (2006.01)
*C09D 167/02* (2006.01)

(56) References Cited

U.S. PATENT DOCUMENTS

| | | |
|---|---|---|
| 5,567,761 A | 10/1996 | Song |
| 5,959,028 A | 9/1999 | Irie et al. |
| 6,897,264 B2 | 5/2005 | Lachowicz et al. |
| 7,144,605 B2 | 12/2006 | Kanakura et al. |
| 8,142,855 B2 | 3/2012 | Bowman |
| 8,754,145 B1 | 6/2014 | Haubrich et al. |
| 9,260,626 B2 | 2/2016 | Brinkhuis et al. |
| 9,328,275 B2 | 5/2016 | Anderson et al. |
| 2004/0219381 A1 | 11/2004 | Kanakura et al. |
| 2006/0094804 A1 | 5/2006 | Lachowicz et al. |
| 2006/0148924 A1 | 7/2006 | Lachowicz et al. |
| 2007/0173602 A1 | 7/2007 | Brinkman et al. |
| 2018/0282477 A1 | 10/2018 | Brinkhuis et al. |

OTHER PUBLICATIONS

Brinkhuis, R., J. Schutyser, F. Thys, E. De Wolf, T. Buser, J. Kalis, N. Magnus, and F. Van Wijk. "Taming the Michael Addition Reaction." European Coatings Journal (2015): 34-40.

Allnex, "Acure TM 500 Preliminary Technical Datasheet", Apr. 2019, 2 pgs.

International Search Report and Written Opinion of the International Application No. PCT/US2022/022480, dated Jun. 26, 2022, 12 pg.

* cited by examiner

TRIPHENYLPHOSPHINE-CONTAINING COATINGS WITH ENHANCED ADHESION TO UNPRIMED SURFACES

CROSS REFERENCE

This application claims the benefit of U.S. Provisional Patent Application No. 63/168,550, filed Mar. 31, 2021, the entire contents of which is incorporated herein by reference.

TECHNICAL FIELD

This disclosure relates to coating compositions and, more particularly, to curable coating compositions containing triphenylphosphine as a catalyst and/or adhesion promoter.

BACKGROUND

Untreated metal surfaces can experience corrosion when exposed to weather or other elements. Corrosion can be considered as an interaction of a material with its environment that results in an irreversible degradation of the material. Organic coatings are often used to prevent the surface of a material from coming into contact with the corrosive environment. The organic coatings can be water-based or organic solvent-based. In either case, an organic coating applied over and adhered to an underlying surface can help abate corrosion.

Adhesion failure of a coating can occur when the bond between the coating and the surface is broken. To help improve coating adhesion, the surface to be protected may be treated and/or primed prior to applying the coating. Surface treatment may involve cleaning and/or chemical surface preparation. A surface-tolerant primer may be used to provide corrosion protection to less thoroughly cleaned surfaces. In either case, coating systems often require multiple layers and preparation steps to provide adequate protection for the substrate being coated.

SUMMARY

In general, this disclosure is directed to coating compositions, coated substrates, and associated techniques that utilize a triphenylphosphine catalyst to promote a Michael addition reaction between a Michael addition reaction donor molecule and a Michael addition reaction acceptor molecule. The components of the coating composition can be combined together to form a curable coating formulation that can be applied to a surface, such as a metal substrate, wood substrate, or substrate of other composition. While the substrate may be primed and/or prepared prior to application of the curable coating formulation, in some implementations, the curable coating formulation is applied to a bare surface, such as a bare metal or bare wood surface. In other words, the curable coating formulation may be applied to the surface of a substrate that does not have an underlying primer layer (e.g., organic coating) applied to its surface.

In some implementations, the composition includes a component that includes two or more active methylene groups and/or active methine groups, a component that includes at least two $\alpha,\beta$-unsaturated carbonyl groups, and the triphenylphosphine catalyst. The triphenylphosphine catalyst can promote a Michael reaction between the two or more components. Applicant has identified unexpectedly good properties of a curable coating composition utilizing triphenylphosphine as a Michael reaction catalyst, including unexpectedly good adhesion and hardness properties, including when applied to bare metal surfaces. As a result, the coating composition may be applied to bare surfaces (e.g., bare metal, bare wood) without requiring a primary layer yet exhibit corrosion and/or protection characteristics consistent with multi-layer coating systems.

Without wishing to be bound by any particular theory, it is believed that the triphenylphosphine molecule may function to both catalyze the Michael addition reaction and promote adhesion to the metal surface. During reaction, the triphenylphosphine catalyst is not completely consumed but rather is regenerated, e.g., resulting in the presence of free or unbound triphenylphosphine in the composition. This free triphenylphosphine can create a metal ligand with the surface of the metal substrate, when coating on a metal substrate. For example, a covalent bond may be formed between the triphenylphosphine and the metal substrate while a physical bond is created between the triphenylphosphine and the reaction products of the coating composition. As a result, the triphenylphosphine may physically and/or chemically interlock the reaction products of the coating composition to the surface of the metal substrate.

In one example, a curable resin composition is described that includes at least (a) a component comprising two or more active methylene groups and/or active methine groups, (b) a component comprising at least two $\alpha,\beta$-unsaturated carbonyl groups, and (c) a triphenylphosphine catalyst that promotes a Michael reaction between said components (a) and (b).

In another example, a method of coating a substrate is described. The method includes mixing a curable resin composition that includes a component comprising two or more active methylene groups and/or active methine groups, a component comprising at least two $\alpha,\beta$-unsaturated carbonyl groups, and a triphenylphosphine catalyst, thereby promoting a Michael reaction between the component comprising two or more active methylene groups and/or active methine groups and the component comprising at least two $\alpha,\beta$-unsaturated carbonyl groups. The method further includes applying the curable resin composition to a substrate.

In another example, a coated substrate is described that includes a substrate defining a surface and a coating deposited on the surface. The example specifies that the coating is formed by curing a resin composition comprising at least one component comprising two or more active methylene groups and/or active methine groups, at least one component comprising at least two $\alpha,\beta$-unsaturated carbonyl groups, and a triphenylphosphine catalyst.

The details of one or more examples are set forth in the accompanying drawings and the description below. Other features, objects, and advantages will be apparent from the description and drawings, and from the claims.

BRIEF DESCRIPTION OF DRAWINGS

FIG. 1 is a side view of an example coated substrate showing a coating layer deposited directly on the surface of the substrate.

DETAILED DESCRIPTION

Figure 2B:
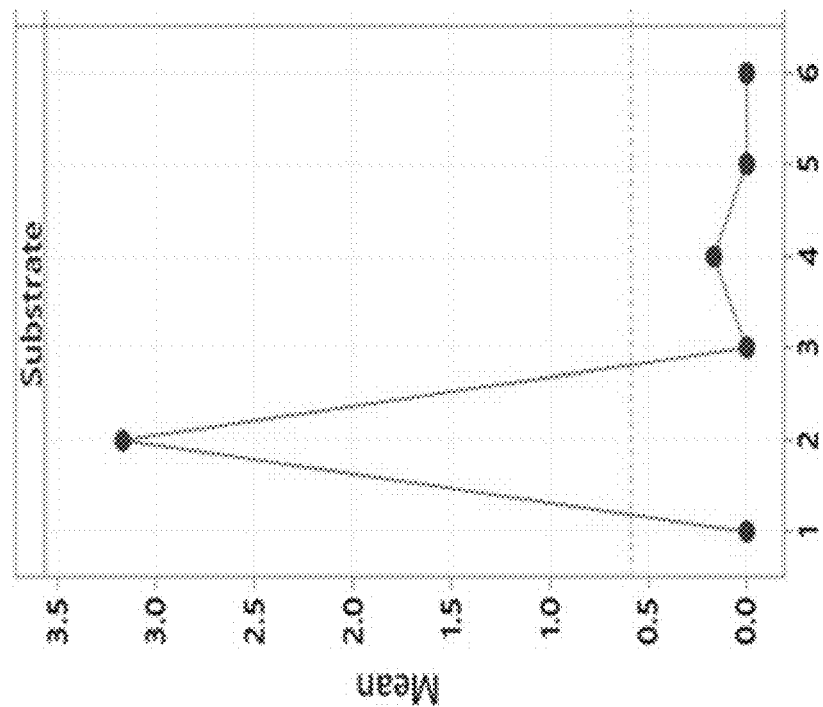
FIGS. 2A and 2B are plots of experimental adhesion characteristics of coatings formulated with two different Michael additional catalysts, one of which is triphenylphosphine.

This disclosure is generally directed to coating compositions, coated substrates, and associated techniques that utilize a triphenylphosphine catalyst to promote a Michael addition reaction between a Michael donor molecule and a Michael acceptor molecule. The Michael addition reaction is a known process where a Michael acceptor is reacted with a Michael donor to elongate a carbon chain. The Michael addition reaction involves the nucleophilic addition of a carbanion or another nucleophile to an α,β-unsaturated carbonyl compound containing an electron withdrawing group.

For example, typical Michael acceptor molecules are α,β-unsaturated carbonyl compounds containing an electron withdrawing group. Typical Michael donor molecules are compounds with at least one Michael donor functional group, which is a hydrogen atom attached to a carbon atom that is located between two electron-withdrawing groups such as C=O and/or C≡N. Examples of Michael donor functional groups include malonate esters, acetoacetate esters, malonamides, acetoacetamides, cyanoacetate esters, and cyanoacetamides.

Compositions according to the present application include triphenylphosphine as a catalyst and/or adhesion promoter. The triphenylphosphine can initiate a nucleophilic attack on the β-position of the Michael acceptor molecule, thereby generating a phosphonium base anion. The generated α-carbanion can react as a nucleophile on the Michael donor molecule. Through the reaction mechanism, the Michael acceptor molecule is added to the Michael donor molecule, with the triphenylphosphine being recovered. As a result, after reaction of the reactable constituent components in the composition, unbound or free triphenylphosphine molecules may remain in the composition. These residual unbound triphenylphosphine molecules in the composition are believed to contribute to the performance characteristics of the coating and, when applied to bare metal surfaces, may create a coordinate covalent bond with the metal atoms of the metal substrate. The use triphenylphosphine has been found to provide a coating with unexpectedly good performance characteristics compared to compositions form of similar reactable components but utilizing a different Michael additional catalyst.

The compositions according to the disclosure can be used as surfaces coatings for protecting substrates and surfaces from environmental conditions. The constituent components may be provided in a two-part or a multi-part system in which the Michael acceptor molecule(s), Michael donor molecule(s), and/or the triphenylphosphine are physically separated until being combined together at the time of use. For example, in one implementation of a two-part system, the Michael acceptor molecule(s) and the Michael donor molecule(s) may be provided in one container, and the triphenylphosphine provided in a second container, with at least a portion of the contents of the containers being combined together to formulate the composition prior to application to a desired surface. As another example, the triphenylphosphine may be provided in one container with one of the Michael acceptor molecule(s) and the Michael donor molecule(s), with the other of the Michael acceptor molecule(s) and the Michael donor molecule(s) provided in a second container. At least a portion of the contents of the two containers can be combined together to formulate the composition prior to applying to a desired surface.

When the constituent components are combined, the composition may exhibit a good pot life and cure rate, providing an effective window of usability while still curing and drying in at a commercially reasonable rate. For example, when the constituent components of the composition are combined and mixed together, the resulting composition may exhibit fluid viscosity characteristics for a period of time effective for the composition to be deployed before gelling or film formation occurs. For example, the mixed composition may exhibit a viscosity substantially similar to the viscosity of one more constituent components (e.g., the plus or minus 20% of the viscosity of the Michael acceptor and/or Michael donor molecules) for a period of at least 15 minutes, such as a least 30 minutes, at least 45 minutes, or at least 1 hour. For example, the mixed composition may exhibit such a viscosity for a period ranging from 45 minutes to 3 hours, such as from 1 hour to 1.5 hours. The mixed composition may cure under ambient conditions.

A Michael donor molecule included in the composition may be, or include, at least one component that includes two or more active methylene groups and/or active methine groups. As such compounds, there can be mentioned reaction products of polyol with a carboxylic acid compound containing an active methylene group and/or an active methine group and/or a carboxylic acid ester containing an active methylene group and/or an active methine group. As the above carboxylic acid compounds and carboxylic acid esters containing active methylene groups, there can be specifically mentioned acetoacetic acid, malonic acid, cyanoacetic acid and derivatives thereof, and esters thereof. Moreover, as the above carboxylic acid compounds and carboxylic acid esters containing active methine groups, there can be mentioned methanetricarboxylic acids, derivatives thereof and alkylesters thereof. The above active methylene group may be a methylene group sandwiched between two carbonyl groups, thereby being in a state of having electrons in excess and being easy to form with a carbanion by releasing a proton. The methine group may be a methine group surrounded with three carbonyl groups.

As polyols described above, there can be mentioned compounds having two or more hydroxyl groups per one molecule, for example, ethylene glycol, diethylene glycol, propylene glycol, tetramethylene glycol, 1,6-hexanediol, neopentyl glycol, trimethylolpropane, glycerin, pentaerythritol, 1,4-cyclohexanedimethanol, 4,4'-isopropylidenedicyclohexanol, bis(hydroxymethyl)tricyclo[5,2,1,0]decane, 1,3,5-tris(2-hydroxyethyl)cyanuric acid and isopropylidenebis (3,4-cyclohexanediol), and addition products of these polyols with ethylene oxides, propylene oxides and caprolactones and the like. As the above polyols, there can be further mentioned acrylic polyols, polyester polyols, polyether polyols, epoxy polyols, polyurethane polyols, silicone polyols and so on.

Moreover, the Michael donor may be a polyester resin having two or more active methylene groups per one molecule obtainable by polycondensation of the above polyol with malonic acid or malonate ester.

Additionally or alternatively, the Michael donor may be a reaction product of a polyamine compound with diketene. Example polyamine compounds include compounds having two or more amino groups per one molecule, for example, ethylenediamine, 1,3-diaminopropane, 1,4-diaminobutane, 1,6-hexanediamine, 1,12-diaminedodecane, 1,2-diaminocyclohexane, phenylenediamine, piperazine, 2,6-diaminotoluene, diethyltoluenediamine, N,N'-bis(2-aminopropyl)ethylenediamine, N,N'-bis(3-aminopropyl)-1,3-propanediamine and others.

In some examples, the Michael donor is, or includes, a polyester resin or an acrylic resin from the viewpoint of compatibility with other components.

Thus, an exemplarily list of Michael donor molecules include pentane-2,4-dione, hexane-2,4-dione, heptane-2,4-dione, 1-methoxy-2,4-pentanedione, 1-phenyl-1,3-butanedione, 1,3-diphenyl-1,3-propanedione, 4,6-dioxoheptanoic acid methyl ester, 5,7-dioxooctanoic acid methyl ester, benzoylacetic acid methyl ester, benzoylacetic acid ethyl ester, benzoylacetic acid butyl ester, propionylacetic acid ethyl ester, propionylacetic acid butyl ester, butyrylacetic acid methyl ester, acetoacetic acid methyl ester, acetoacetic acid ethyl ester, acetoacetic acid isopropyl ester, acetoacetic acid butyl ester, acetoacetic acid tert-butyl ester, acetoacetic acid-(2-methoxyethyl)ester, acetoacetic acid-(2-ethylhexyl) ester, acetoacetic acid lauryl ester, 2-acetoacetoxyethyl acrylate, 2-acetoacetoxyethyl methacrylate, acetoacetic acid benzyl ester, 1,4-butanediol diacetoacetate, 1,6-hexanediol diacetoacetate, neopentyl glycol diacetoacetate, 2-ethyl-2-butyl-1,3-propanediol diacetoacetate, cyclohexanedimethanol diacetoacetate, ethoxylated bisphenol A diacetoacetate, trimethylolpropane triacetoacetate, glycerol triacetoacetate, pentaerythritol triacetoacetate, pentaerythritol tetraacetoacetate, ditrimethylolpropane tetraacetoacetate, dipentaerythritol hexaacetoacetate as well as acetoacetate group-containing oligomers and polymers obtained by transesterification of acetoacetic acid ethyl ester with oligomeric or polymeric polyols, and acetoacetate group-containing oligomers and polymers obtained by copolymerisation of 2-acetoacetoxyethyl methacrylate, malonic acid dimethylester, malonic acid diethylester, malonic acid dipropylester, malonic acid diisopropylester, malonic acid dibutylester, malonic acid di(2-ethylhexylester), malonic acid dilaurylester, oligomers and polymers obtained by of dialkyl malonates and diols.

A number average molecular weight of the Michael donor molecule may range from 300 to 10,000, such as from 500 to 3,000. If the number average molecular weight is less than 300, a hardness of the resulting coating film may become low and curability of the coating may be insufficient, thereby solvent resistance, water resistance and weather resistance of the coating film may possibly deteriorate. On the other hand, if it exceeds 10,000, a viscosity of the component may itself become high, thereby a content of an organic solvent in the diluted coating upon application may be excessive.

A Michael acceptor molecule included in the composition may be, or include, at least one component that includes at least two α,β-unsaturated carbonyl groups. Example compounds containing α,β-unsaturated carbonyl groups, which are suitable for the preparation of the compositions of the present disclosure include, for example, 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol A diglycidyl ether diacrylate, ethoxylated bisphenol A diglycidyl ether diacrylate, polyethylene glycol diacrylate, trimethylolpropane triacrylate, ethoxylated trimethylolpropane triacrylate, propoxylated trimethylolpropane triacrylate, propoxylated glycerol triacrylate, tris(2-acryloyloxyethyl)isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate, dipentaerythritol hexaacrylate, 1,2-ethanediol dimethacrylate, 1,3-propanediol dimethacrylate, 1,4-butanediol dimethacrylate, 1,6-hexanediol dimethacrylate, dipropylene glycol dimethacrylate, neopentyl glycol dimethacrylate, ethoxylated neopentyl glycol dimethacrylate, propoxylated neopentyl glycol dimethacrylate, tripropylene glycol dimethacrylate, bisphenol A diglycidyl ether dimethacrylate, ethoxylated bisphenol A diglycidyl ether dimethacrylate, polyethylene glycol dimethacrylate, trimethylolpropane trimethacrylate, ethoxylated trimethylolpropane trimethacrylate, propoxylated trimethylolpropane trimethacrylate, propoxylated glycerol trimethacrylate, tris(2-methacryloyloxyethyl)isocyanurate, pentaerythritol trimethacrylate, ethoxylated pentaerythritol trimethacrylate, pentaerythritol tetramethacrylate, ethoxylated pentaerythritol tetramethacrylate, ditrimethylolpropane tetramethacrylate, dipentaerythritol pentamethacrylate, dipentaerythritol hexamethacrylate as well as acrylate group-containing oligomers and polymers obtained by reacting polyepoxides with acrylic acid (epoxyacrylates) or obtained by reacting polyester polyols with acrylic acid and/or monomeric alkyl acrylates (polyester acrylates). Furthermore, suitable are also oligomeric or polymeric fumarates maleates, itaconates, cinnamates as well as derivatives of crotonic acid and vinyl ketones.

A number average molecular weight of the Michal acceptor molecule may range from 200 to 10,000, such as from 300 to 3,000. If the above number average molecular weight is less than 200, a hardness of the resulting coating film may be decreased, or curability of the coating may become insufficient, whereby solvent resistance, water resistance and weather resistance of the coating film may possibly deteriorate. On the other hand, if it exceeds 10,000, a viscosity of the component itself may become high and a content of an organic solvent in the diluted coating upon application may become excessive The composition also includes the triphenylphosphine catalyst. The triphenylphosphine catalyst may be in its pure state or in a solvent. The triphenylphosphine catalyst may be in unmodified form having a molecular formula $(C_6H_5)_3P$, or one or more of the benzene rings of the triphenylphosphine catalyst may be modified by substituting one or more hydrogen atoms at the ortho, meta, and/or para positions for activating and deactivating substituents to attenuate reaction rates and Tolman cone angles such as, e.g., linear, branched, or cyclic alkyl chains having a carbon chain length ranging from one to six carbon, alkoxy groups, organic acid groups, halogen groups, or readily ionizable groups including but not limited to anionic sulfate based groups or cationic ammonium based groups. One example of such a modified form is Tris(2,4,6-trimethylphenyl)phosphine.

The compositions according to the disclosure can include a variety of additional additives include, but are not limited to, defoamer agents, extender pigments, coloring pigments, sag-preventing agents, UV absorbers and the like. In different examples, the coating composition may be clear or may include a pigment. In some implementations, the coating composition is free of isocyanate compounds.

The coating composition and/or constituent components thereof may be dissolved or dispersed in an organic solvent conventionally used in the coating industry. Example solvents include aliphatic hydrocarbons such as hexane or heptane; aromatic hydrocarbons such as toluene or xylene; petroleum fractions having a suitable boiling point range; esters such as butyl acetate, ethylene glycol diacetate or 2-ethylhexyl acetate; ketones such as acetone, methyl ethyl ketone (MEK), methyl isobutyl ketone (MIBK) or cyclohexanone; ethers such as tetrahydrofuran, ethylene glycol dimethyl ether, ethylene glycol diethyl ether or ethylene glycol dibutyl ether; alcohols such as butanol or methoxypropanol; and mixtures of these solvents.

The relative proportion of the Michael donor molecule(s) in the coating composition may range from 5 wt % to 30 wt % of the overall coating composition (weight of the Michael donor molecule(s) divided by the combined weight of all the constituent components of the composition), such as from 10 wt % to 25 wt %, from 15 wt % to 20 wt %, or from 16 wt % to 19 wt %. Additionally or alternatively, the relative proportion of the Michael acceptor molecule(s) in the coating composition may range from 10 wt % to 40 wt % of the overall coating composition (weight of the Michael acceptor molecule(s) divided by the combined weight of all the constituent components of the composition), such as from 15 wt % to 35 wt %, from 20 wt % to 30 wt %, or from 24 wt % to 28 wt %. Further additionally or alternatively, the relative proportion of the triphenylphosphine catalyst in the coating composition may range from 0.5 wt % to 7.5 wt % of the overall coating composition (weight of the triphenylphosphine catalyst divided by the combined weight of all the constituent components of the composition), such as from 1 wt % to 5 wt %, or from 2 wt % to 4 wt %. The balance of the weight of the coating composition may be other constituent components, such as solvent, pigment, and/or other optionally additives.

The constituent components of the coating composition may be mixed together and applied to a substrate using any suitable coating application technique, such as spray coating, roll coating, dip coating, and the like. While the coating composition can be applied to a variety of different substrate materials, the composition may find particular utility in coating metal substrates. Example metal substrates that may be coated with a coating composition according to the disclosure include, but are not limited to, ferrous-containing substrates (e.g., ground cold rolled steel, smooth cold rolled steel, thin steel, iron phosphate treated steel, stainless steel, Galvannealed steel) and aluminum-containing substrates (e.g., chrome treated aluminum). The metal substrates may define any type of structure, such as a tank (e.g., liquid-containing tank, gas-containing tank, drum, tote), transport vessel (e.g., rail car, semi-trailer), building siding, or other substrate structure.

In some applications, the coating composition is applied directly to the bare surface of a metal substrate without first applying one or more primary layers to the metal substrate. FIG. 1 is a side view of an example coated substrate 10 showing a coating layer 12 deposited directly on the surface of the substrate 14. In these applications, the surface of the metal substrate may or may not be chemically and/or physically prepared (e.g., cleaning, etching, sand blasting) prior to application of the coating composition. While the coating composition is efficacious when applied directly to bare metal substrates, the coating composition can also exhibit good performance while applied to a primed surface (e.g., a metal substrate that has one or more primer layers applied to the outermost surface of the metal substrate). Example primers that may be used include acrylic, urethane, epoxy, alkyd, and epoxy ester primers.

The coating composition may be applied to form a coating (e.g., after drying) having a thickness ranging from 0.005 mm to 0.25 mm, such as from 0.001 mm to 0.125 mm. After applying the coating composition over the surface of the substrate, the coating composition can be cured. In some examples, the coated surface is cured under ambient conditions (e.g., ambient temperature and/or humidity). In other examples, the coated surface is cured under controlled conditions, such as controlled humidity and/or elevated heating, such as by baking the coating at a temperature between 100° C. and 200° C., such as between 120° C. and 150° C.

The coating composition can exhibit excellent performance characteristics, even when applied to bare metal surfaces. For example, when the coating composition is applied to a ferrous metal substrate and cured to form a coating, the coating may exhibit an adhesion according to ASTM D3359 Method B of at least 2.5, such as at least 3.0, at least 4.0, or at least 5.0. Additionally or alternatively, when the coating composition is applied to the ferrous metal substrate and cured to form the coating, the coating may exhibit a pencil hardness according to ASTM D3363 of at least 5.0, such as at least 6.0, at least 7.0, or at least 8.0.

While the coating composition exhibits good utility for coating metal substrates, use of the coating composition is not limited to this example class of substrates. Rather, substrates fabricated from a variety of different materials can be coated utilizing a coating composition according to the disclosure and exhibit high performance coating characteristics as described herein. As another particular example, the composition exhibits particularly good utility when coating wood substrates. Example wood substrates that can may be coated with a coating composition according to the disclosure include single-source softwoods (e.g., pine, fir, spruce, cedar), single-source hardwoods (e.g., oak, maple, cherry), and composite woods (e.g., plywood, oriented strand board (OSB), fiberboard, chipboard). The wood substrates may define any type of structure, such as a container (e.g., tank, box), furniture (e.g., desk, dresser, bookcase), building siding, or other substrate structure.

As discussed above with respect to example metal substrates, in some examples when coating a wood substrate, the coating composition is applied directly to the bare surface of a wood substrate without first applying one or more primary layers to the wood substrate (e.g., as illustrated in FIG. 1 where coated substrate 10 shows a coating layer 12 deposited directly on the surface of the substrate 14). In these applications, the surface of the wood substrate may or may not be chemically and/or physically prepared (e.g., sanding) prior to application of the coating composition. While the coating composition is efficacious when applied directly to bare wood substrates, the coating composition can also exhibit good performance while applied to a primed surface (e.g., a wood substrate that has one or more primer layers applied to the outermost surface of the metal substrate). When coating a wood substrate, the coating composition may be applied to any thicknesses and under any appropriate curing conditions, including those discussed above with respect to metal substrates.

The coating composition can exhibit excellent performance characteristics, even when applied to unprimed (e.g., bare) wood surfaces. For example, when the coating composition is applied to a wood substrate and cured (e.g., under ambient conditions for 7 days) to form a coating, the coating may exhibit an adhesion according to ASTM D3359 Method B of at least 3.0, such as at least 4.0, or at least 4.5.

The following examples may provide additional details about coating compositions and coated substrates according to the disclosure.

Example 1

An experiment was conducted to evaluate the performance characteristics of coating compositions, and resulting coatings, formulated using a triphenylphosphine as a Michael addition catalyst compared to equivalent compositions and coatings formed using alternative Michael additional catalysts. For each experimental composition, an acrylate resin was used as a Michael acceptor molecule and a malonate-functional resin was used as a Michael donor molecule. The experiment evaluated two different formulations of malonate and acrylate resins for each different catalyst evaluated. The non-catalyst components of the two formulations are summarized in tables 1 and 2 below.

TABLE 1

Coating composition formulation 1.
Formulation 1

| Item Name | Weight in Lbs | Weight % on Total Formula |
|---|---|---|
| Di Trimethylolpropane tetraacrylate resin | 195.39 | 18.50% |
| pigment dispersant | 8.78 | 0.83% |

TABLE 1-continued

Coating composition formulation 1.
Formulation 1

| Item Name | Weight in Lbs | Weight % on Total Formula |
|---|---|---|
| antifoam/air release additive | 4.36 | 0.41% |
| antifoam/air release additive | 2.21 | 0.21% |
| Titanium Dioxide | 439.27 | 41.60% |
| Malonated polyester resin | 219.8 | 20.82% |
| Malonated polyester resin with succinimide | 68.3 | 6.47% |
| solvent | 22 | 2.08% |
| solvent | 88.8 | 8.41% |
| flow and defoamer additive | 2.6 | 0.25% |
| UV light stabilizer | 4.4 | 0.42% |
| TOTAL | 1055.91 | 100.00% |

TABLE 2

Coating composition formulation 2.
Formulation 2

| Item Name | Weight in Lbs | Weight % on Total Formula |
|---|---|---|
| Trimethylolpropane triacrylate resin | 148.1 | 11.46% |
| pigment dispersant | 27.6 | 2.14% |
| Titanium Dioxide | 552.9 | 42.78% |
| Dimethyl malonate alkyd resin | 282.6 | 21.86% |
| Acetoacetatefunctional polyester resin | 49.9 | 3.86% |
| Aliphatic urethane acrylate resin | 73.7 | 5.70% |
| solvent | 47 | 3.64% |
| flow and defoamer additive | 102.4 | 7.92% |
| UV light stabilizer | 8.3 | 0.64% |
| TOTAL | 1292.5 | 100.00% |

Four different Michael addition catalysts were studied in each composition formulated according to Tables 1 and 2: sodium hydroxide in ethanol, potassium hydroxide in ethanol, 1,4 diazabicyclo octane (DABCO), triphenylphosphine, and a blocked tetrabutylammonium blend. The catalysts were tested at various levels to evaluate the impact of different concentration levels. The different compositions were initially tested by mixing the compositions together and applying each composition to the unprimed surface of a cold rolled steel substrate using a conventional spray gun. Table 3 reports observations on the different compositions.

TABLE 3

Observations regarding different compositions applied to cold rolled steel panels.

| Catalyst Type | Formula Number | Catalyst Level (wt %) | Observations |
|---|---|---|---|
| Sodium Hydroxide NaOH | 1 | 0.5% | No Reaction, film was wet even after 16 hours |
| 25% solution in Ethanol and Water | 1 | 1.3% | Spontaneous exothermic reaction, Gelled in 5 minutes, not possible to spray |
| | 2 | 0.3% | No Reaction, film was wet even after 16 hours, grit formation |
| Potassium Hydroxide KOH | 1 | 0.3% | No Reaction, film is wet even after 16 hours |
| 25% solution in Ethanol and Water | 1 | 0.5% | No Reaction, film is wet even after 16 hours |
| | 2 | 0.3% | No Reaction, film was wet even after 16 hours, grit formation |
| DABCO | 1 | 4.0% | No Reaction, film was wet even after 16 hours |
| | 2 | 1.0% | No Reaction, film was wet even after 16 hours |
| | 2 | 4.0% | No Reaction, film was wet even after 16 hours |
| Triphenylphosphine | 1 | 2.0% | Hard cured film |
| | 1 | 3.5% | Hard cured film |
| | 1 | 5.0% | Hard cured film |

TABLE 3-continued

Observations regarding different compositions applied to cold rolled steel panels.

| Catalyst Type | Formula Number | Catalyst Level (wt %) | Observations |
|---|---|---|---|
| | 2 | 2.0% | Hard cured film |
| | 2 | 3.5% | Hard cured film |
| | 2 | 5.0% | Hard cured film |
| Tetrabutylammonium carbonate blend | 1 | 2.0% | Hard cured film |
| | 1 | 3.5% | Hard cured film |
| | 1 | 5.0% | Hard cured film |
| | 2 | 2.0% | Hard cured film |
| | 2 | 3.5% | Hard cured film |
| | 2 | 5.0% | Hard cured film |

Based on the observations summarized in Table 3, three of the five catalysts were eliminated from further substrate testing. Sodium hydroxide, potassium hydroxide, and DABCO did not cure the film or they created a spontaneous, non-uniform reaction where the coating would not form a complete film. The catalysts triphenylphosphine and blocked tetrabutylammonium blends cured the film completely in both formulation types and at various catalyst levels. These two catalysts were then studied further to evaluate the properties of films formed using each catalyst.

Example 2

Two coating compositions were formulated according to formulation 1 reported in Table 1 for the non-catalyst components. Each composition included 2 wt % catalyst based on the overall weight of the composition (weight of catalyst divided by the combined weight of the catalyst and non-catalyst components). One of the two coating compositions was prepared using triphenylphosphine as the catalyst. The second coating composition was preparing using a blocked tetrabutylammonium blend as a catalyst. Each coating was applied by a conventional spray gun to the following substrates: ground cold rolled steel, smooth cold rolled steel, thin steel, iron phosphate treated steel, chrome treated aluminum, and Galvannealed steel. Each substrate was cleaned prior to application of the coating composition, but the surface of each substrate was bare metal (unprimed). Films were allowed to cure for 7 days under ambient conditions before subsequent testing as described below. In FIGS. 2-7 discussed below, the Y-axis in each figure identifies the performance data for the characteristic studies; the X-axis in each figure identifies the type of substrate coated with the coating composition. For each of FIGS. 2-7, the reference numbers on the X-axis correspond to the following materials: 1=smooth cold rolled steel; 2=iron phosphate treated steel; 3=Galvannealed steel; 4=chrome treated aluminum; 5=thin steel; and 6=ground cold rolled steel.

Adhesion Evaluation

Figure 2A:
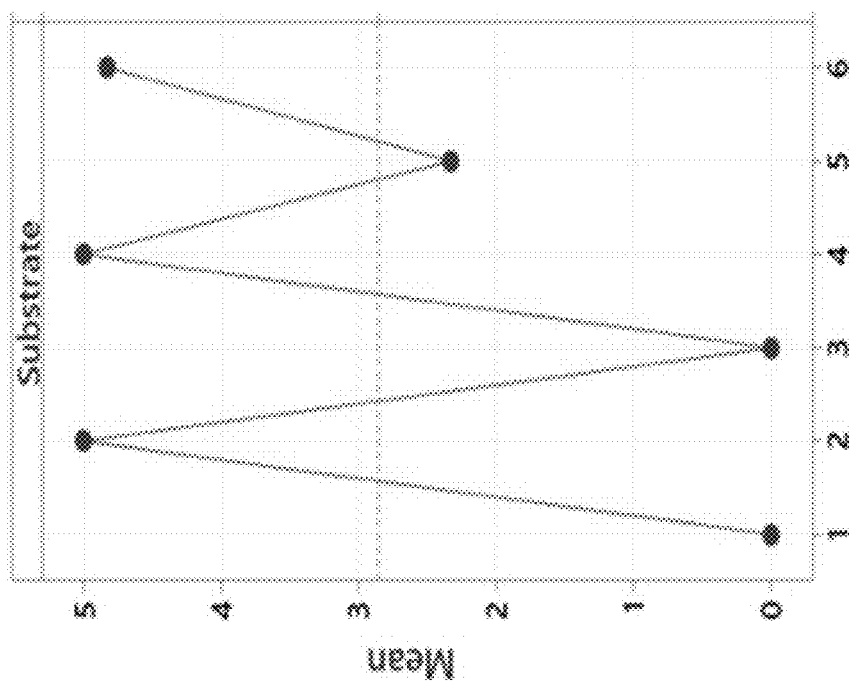

The adhesion characteristics of the coatings on each substrate were evaluated according to ASTM D3359 Method B. FIG. 2A illustrates the adhesion characteristics for the coating formulated with the triphenylphosphine catalyst on different substrates. FIG. 2B illustrates the adhesion characteristics for the coating formulated with the blocked tetrabutylammonium blend catalyst on different substrates.

The data show a clear benefit to adhesion over a wide range of substrates when using triphenylphosphine as a catalyst. Superior adhesion is seen over chrome treated aluminum, thin steel, iron phosphate treated steel, and ground cold rolled steel when using triphenylphosphine. When using tetrabutylammonium, poorer adhesion is seen to iron phosphate treated steel, and no adhesion is seen to any other substrates.

Solvent Rub Evaluation

Figure 3B:
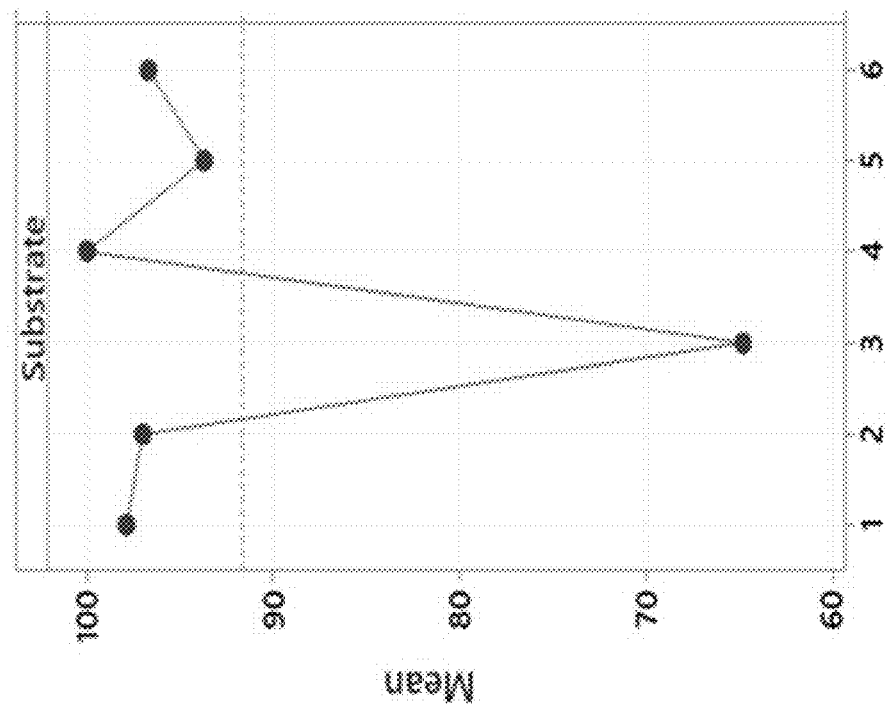
FIGS. 3A and 3B are plots of experimental rub performance for coatings formulated with two different Michael additional catalysts, one of which is triphenylphosphine.
Figure 3A:
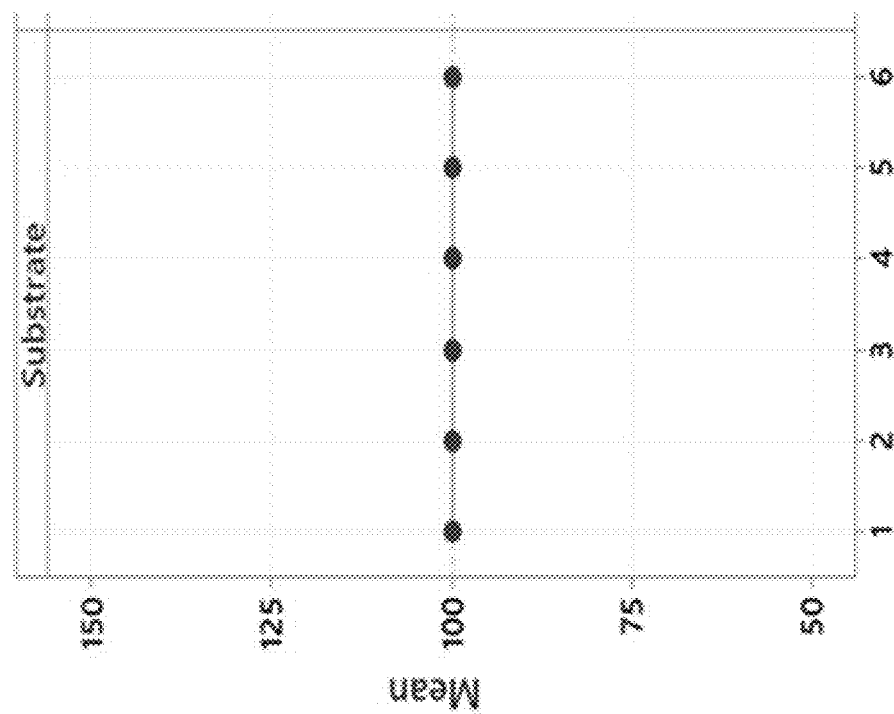

The cure characteristics of the coatings on each substrate were evaluated by performing 100 MEK solvent rub according to ASTM D5402. FIG. 3A illustrates the rub performance for the coating formulated with the triphenylphosphine catalyst on different substrates. FIG. 3B illustrates the rub performance for the coating formulated with the blocked tetrabutylammonium blend catalyst on different substrates.

The triphenylphosphine catalyst-containing coatings displays high, consistent MEK solvent rubs (100+) across all types of substrates. When using tetrabutylammonium catalyst, 90 rubs are achieved over most substrates, except for Galvannealed. For the Galvannealed sample, the catalyst is blocked by the zinc treated panel. The data show an inconsistency in the cure response of the coating when using the tetrabutylammonium based catalyst.

Gloss Evaluation

Figure 4A:
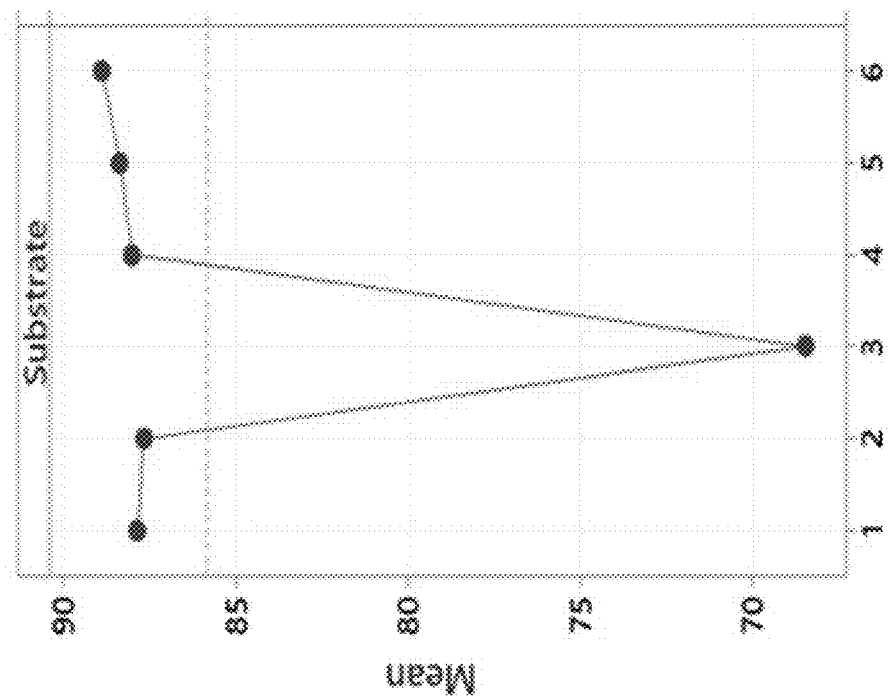
FIGS. 4A and 4B are plots of experimental gloss characteristics of coatings formulated with two different Michael additional catalysts, one of which is triphenylphosphine.
Figure 4B:
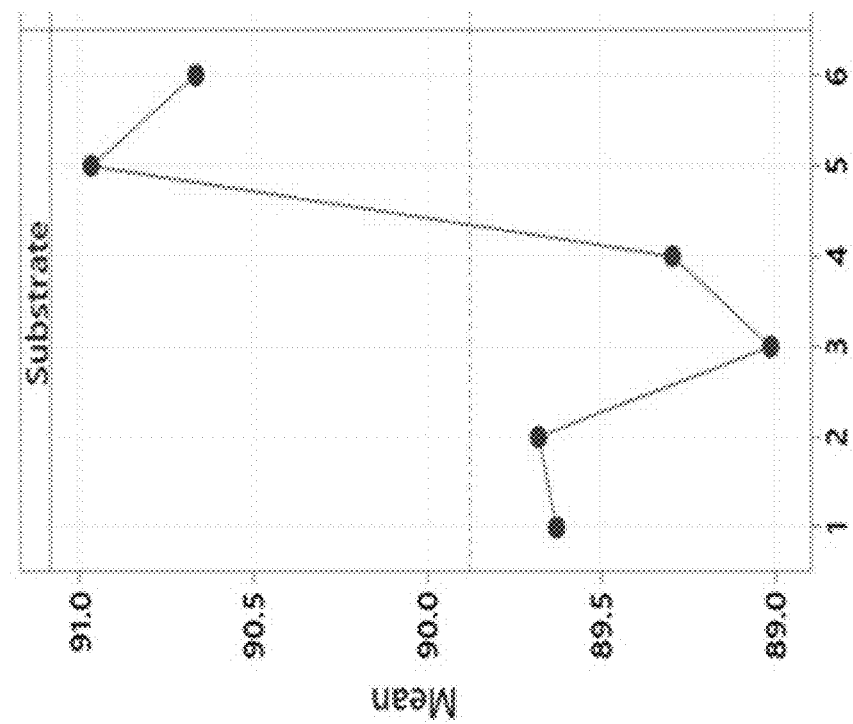

The gloss characteristics of the coatings on each substrate were evaluated at 60 degrees according to ASTM D523. FIG. 4A illustrates the gloss characteristics for the coating formulated with the triphenylphosphine catalyst on different substrates. FIG. 4B illustrates the gloss characteristics for the coating formulated with the blocked tetrabutylammonium blend catalyst on different substrates. Coating gloss characteristics are not typically affected by the type of catalyst chosen. The data are consistent with this typical observation.

Pencil Hardness Evaluation

Figure 5B:
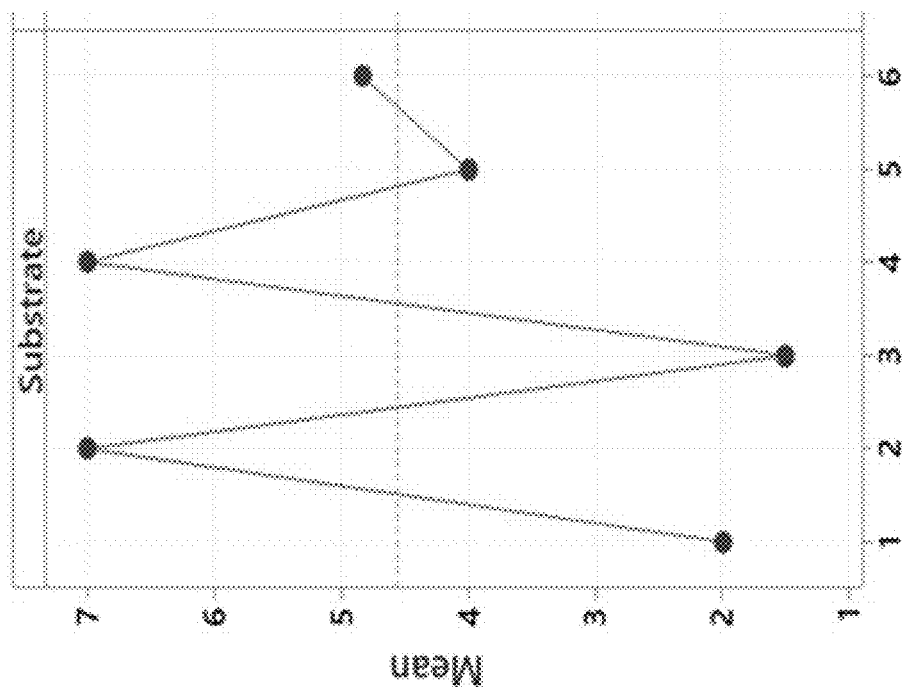
FIGS. 5A and 5B are plots of experimental pencil hardness characteristics of coatings formulated with two different Michael additional catalysts, one of which is triphenylphosphine.
Figure 5A:
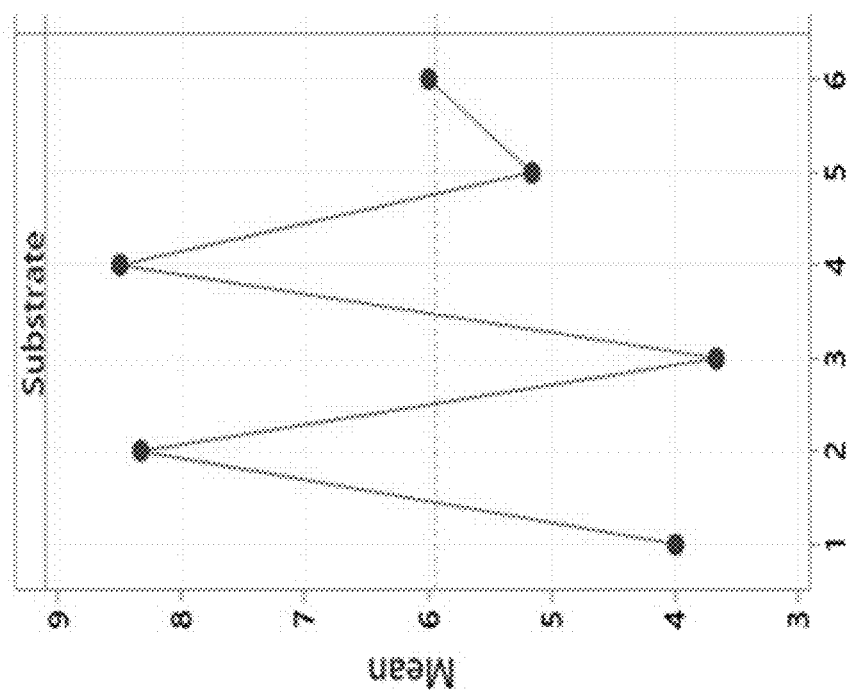

The pencil hardness of the coatings on each substrate were evaluated according to ASTM D3363. FIG. 5A illustrates the pencil hardness characteristics for the coating formulated with the triphenylphosphine catalyst on different substrates. FIG. 5B illustrates the pencil hardness characteristics for the coating formulated with the blocked tetrabutylammonium blend catalyst on different substrates.

The triphenylphosphine catalyst-containing coatings exhibited harder coatings on all substrates compared to the coating formulated with the blocked tetrabutylammonium blend catalyst. Lower hardness is seen when either catalyst is used over smooth steel and Galvannealed steel.

Impact Resistance Evaluation

Figure 6B:
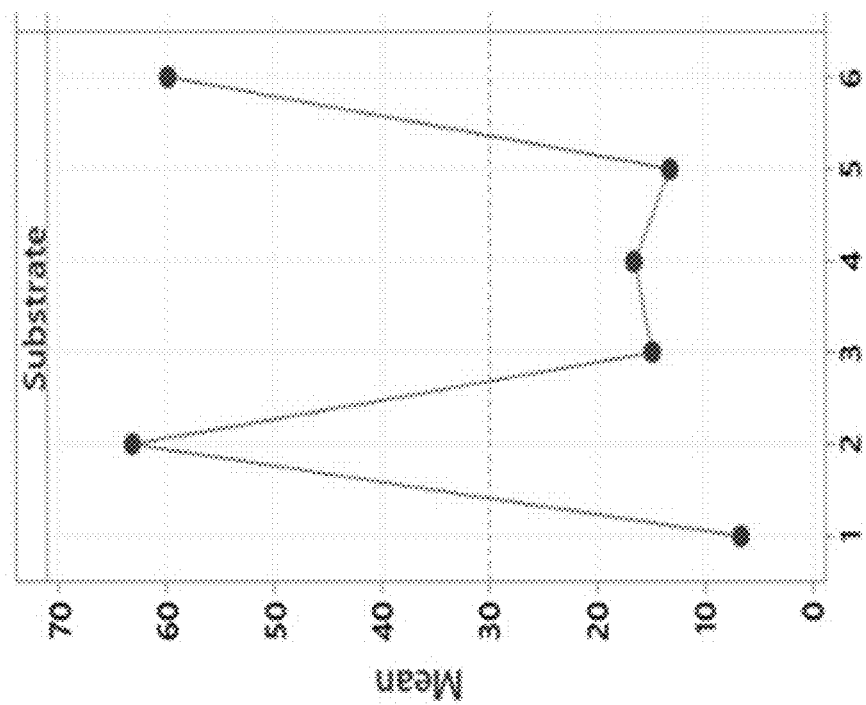
FIGS. 6A and 6B are plots of experimental impact resistance characteristics of coatings formulated with two different Michael additional catalysts, one of which is triphenylphosphine.
Figure 6A:
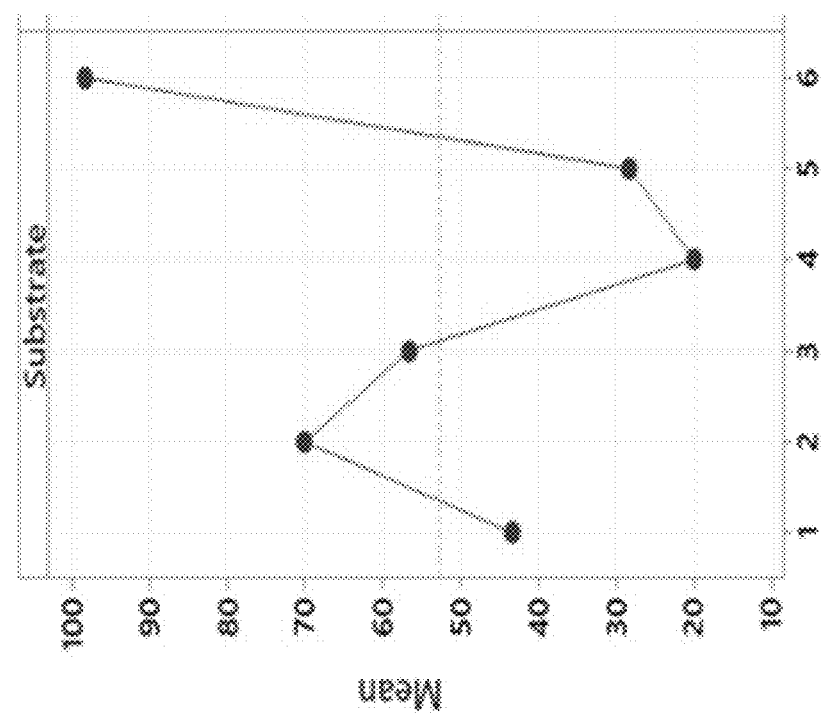

The impact resistance of the coatings on each substrate were evaluated according to ASTM D2794. FIG. 6A illustrates the impact resistance characteristics for the coating formulated with the triphenylphosphine catalyst on different substrates. FIG. 6B illustrates the impact resistance characteristics for the coating formulated with the blocked tetrabutylammonium blend catalyst on different substrates.

The triphenylphosphine catalyst-containing coatings exhibited a higher level of impact resistance on all substrates compared to the coating formulated with the blocked tetrabutylammonium blend catalyst. While tetrabutylammonium produces weaker films over all substrates, but it is most notable over smooth steel, Galvannealed steel, and thin steel.

Mandrel Bend Evaluation

Figure 7B:
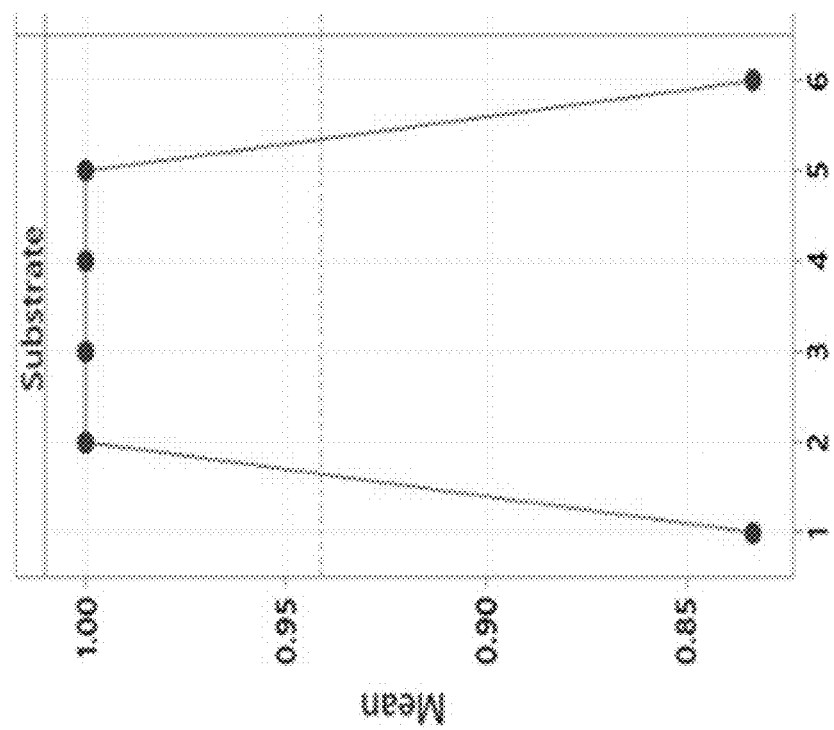
FIGS. 7A and 7B are plots of experimental mandrel bend characteristics of coatings formulated with two different Michael additional catalysts, one of which is triphenylphosphine.
Figure 7A:
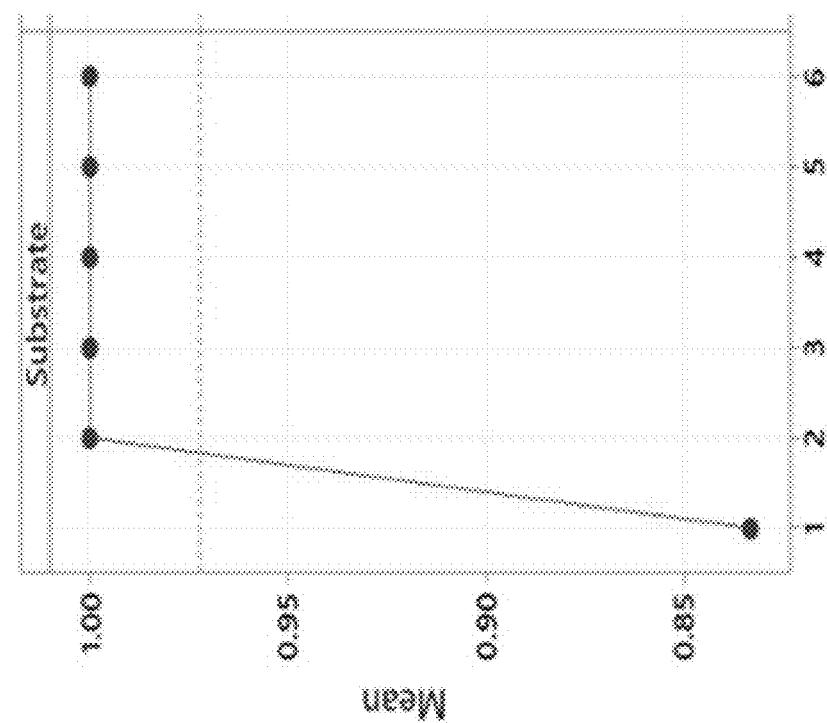

The mandrel bend characteristics of the coatings on each substrate were evaluated according to ASTM D522. FIG. 7A illustrates the mandrel bend characteristics for the coating formulated with the triphenylphosphine catalyst on different substrates. FIG. 7B illustrates the mandrel bend characteristics for the coating formulated with the blocked tetrabutylammonium blend catalyst on different substrates.

Both the triphenylphosphine catalyst-containing coatings and the coating formulated with the blocked tetrabutylammonium blend catalyst perform well on the mandrel bend test over iron phosphate treated steel, Galvannealed steel, chrome treated aluminum, and thin steel. When triphenylphosphine was used over smooth steel, the coating lost its flexibility and showed signs of stress cracking. The same thing was seen when using tetrabutylammonium over both smooth steel and ground cold rolled steel.

Example 3

Based on the superior performance of the coatings formulated with triphenylphosphine as a Michael addition catalyst compared to equivalent compositions and coatings formed using alternative Michael additional catalysts, testing was expanded to evaluate the performance of other phosphine-containing Michael addition catalysts. Different coating compositions were formulated according to formulations 1 and 2 reported in Table 1 for the non-catalyst components. Two different phosphine-containing Michael addition catalysts were used with each formulation at a variety of different weight concentrations: trioctylphosphine and tricyclohexylphosphine, in each case obtained from Sigma Aldrich. The coating compositions, with weight percent of the catalyst used based on the overall weight of the composition (weight of catalyst divided by the combined weight of the catalyst and non-catalyst components) are reported in Tables 4 and 5 below along with corresponding observations. Where feasible, the different compositions were applied to an unprimed surface of a cold rolled steel substrate using a conventional spray gun.

TABLE 4

Coating observations for two different phosphine-containing catalysts mixed with a composition according to formula 1.
Formula 1

| Catalyst % | Comment/Observation |
|---|---|
| Trioctylphosphine | |
| 0.5 | Spontaneous reaction, gelled within 8 minute |
| 1 | Spontaneous reaction, gelled within 4 minute |
| 2 | Spontaneous reaction, gelled within 2 minute |
| Tricyclohexylphosphine | |
| 0.5 | No Reaction, film is wet even after 16 hours |
| 1 | No Reaction, film is wet even after 16 hours |
| 2 | No Reaction, film is wet even after 16 hours |

TABLE 5

Coating observations for two different phosphine-containing catalysts mixed with a composition according to formula 2.
Formula 2

| Catalyst % | Comment/Observation |
|---|---|
| Trioctylphosphine | |
| 0.5 | Skin and grit formation, Rapid catalytic reaction, film curing with moderate speed. |
| 1 | Skin and grit formation, Fast catalytic reaction, film curing very rapidely, |
| 2 | Skin and grit formation, Spontaneous catalytic reaction, film curing within 20-25 minutes |
| Tricyclohexylphosphine | |
| 0.5 | Skin and grit formation, Partial Spontaneous catalytic reaction, no curing |
| 1 | Skin and grit formation, Partial Spontaneous catalytic reaction, no curing |
| 2 | Skin and grit formation, Partial Spontaneous catalytic reaction, no curing |

The coatings formulated with alternative phosphine-containing Michael addition catalysts exhibit serious performance defects, e.g., by failing to cure, curing too fast, and/or forming gel particles.

Example 4

An experiment was conducted to evaluate the performance characteristics of the coating compositions, and resulting coatings, when coated on non-metal substrates, particularly wood substrates. Four different coating compositions were formulated according to formulation 3 reported in Table 6 below for the non-catalyst components. Two of the two coating compositions were prepared using triphenylphosphine as the catalyst: one at a 3.0 wt % catalyst concentration based on the overall weight of the composition (weight of catalyst divided by the combined weight of the catalyst and non-catalyst components) and one at a 4.8 wt % catalyst concentration. The two other coating compositions were prepared using a blocked tetrabutylammonium blend as a catalyst: one at a 3.0 wt % catalyst concentration and one at a 4.8 wt % catalyst concentration.

TABLE 6

Coating composition formulation 3.
Formulation 3

| Item Name | Weight in Lbs | Weight % on Total Formula |
|---|---|---|
| Trimethylolpropane triacrylate resin | 179.6 | 20.22% |
| Malonated resin | 346.07 | 38.96% |
| Acetoacetatefunctional polyester resin | 60.13 | 6.77% |
| Aliphatic urethane acrylate resin | 90.66 | 10.21% |
| Solvent 1 | 159.57 | 17.96% |
| Solvent 2 | 26.42 | 2.97% |
| Resin Plasticizer | 4.06 | 0.46% |
| UV light stabilizer | 5.96 | 0.67% |
| Epoxy Ester | 15.85 | 1.78% |
| TOTAL | 888.32 | 100.00% |

Each coating was applied by a conventional spray gun to the following wood substrates: MDF (medium density fiberboard), maple, oak, poplar, yellow pine, and cedar. The surface of each substrate to which the coating composition was applied was raw wood (devoid of a primer layer). Films were then allowed to cure for 24 hours, 3 days, or 7 days, respectively, under ambient conditions before being tested for adhesion according to ASTM D3359 Method B.

Figure 8A:
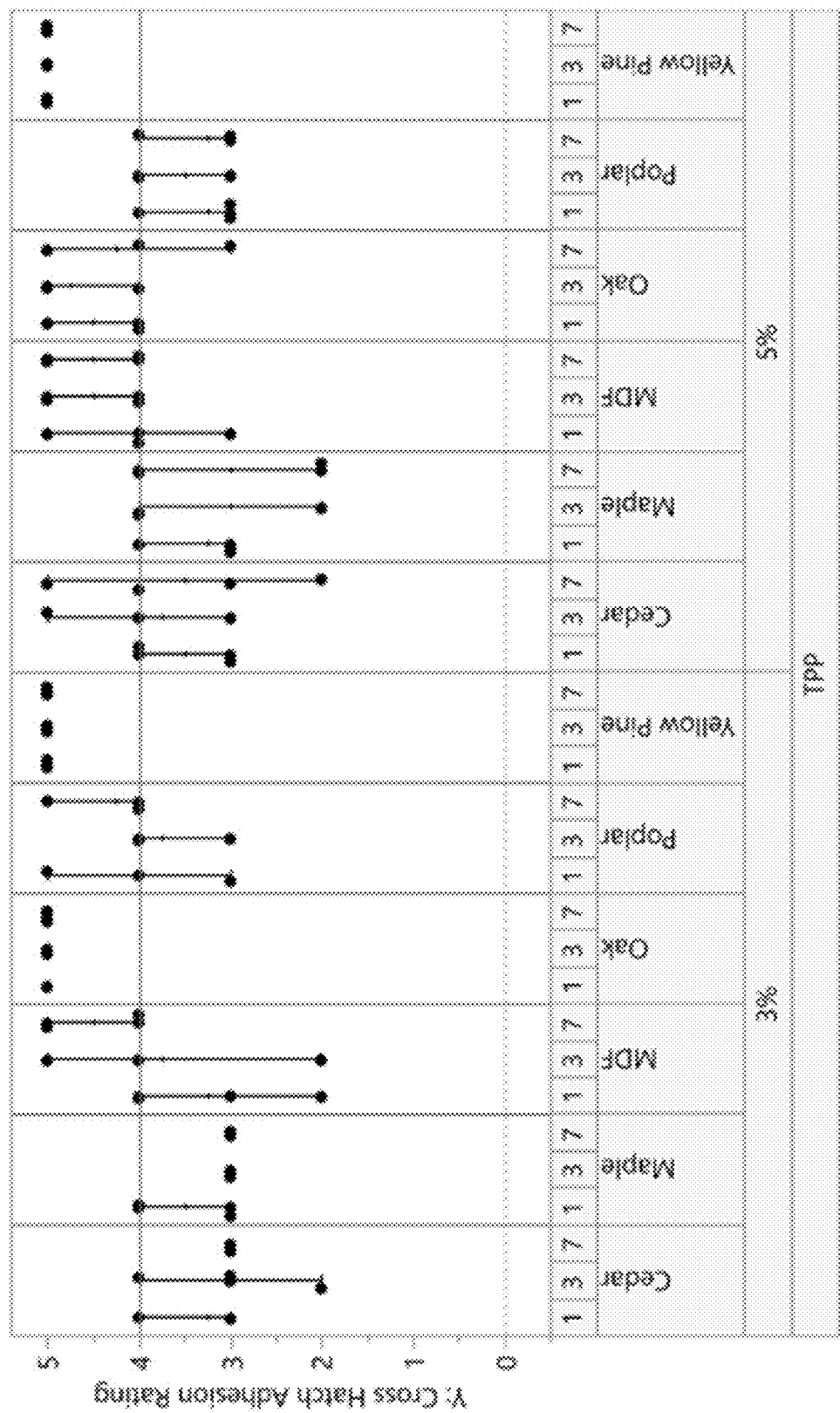
FIGS. 8A and 8B are plots of experimental adhesion characteristics of coatings formulated with two different Michael additional catalysts, one of which is triphenylphosphine, to wood substrates.
Figure 8B:
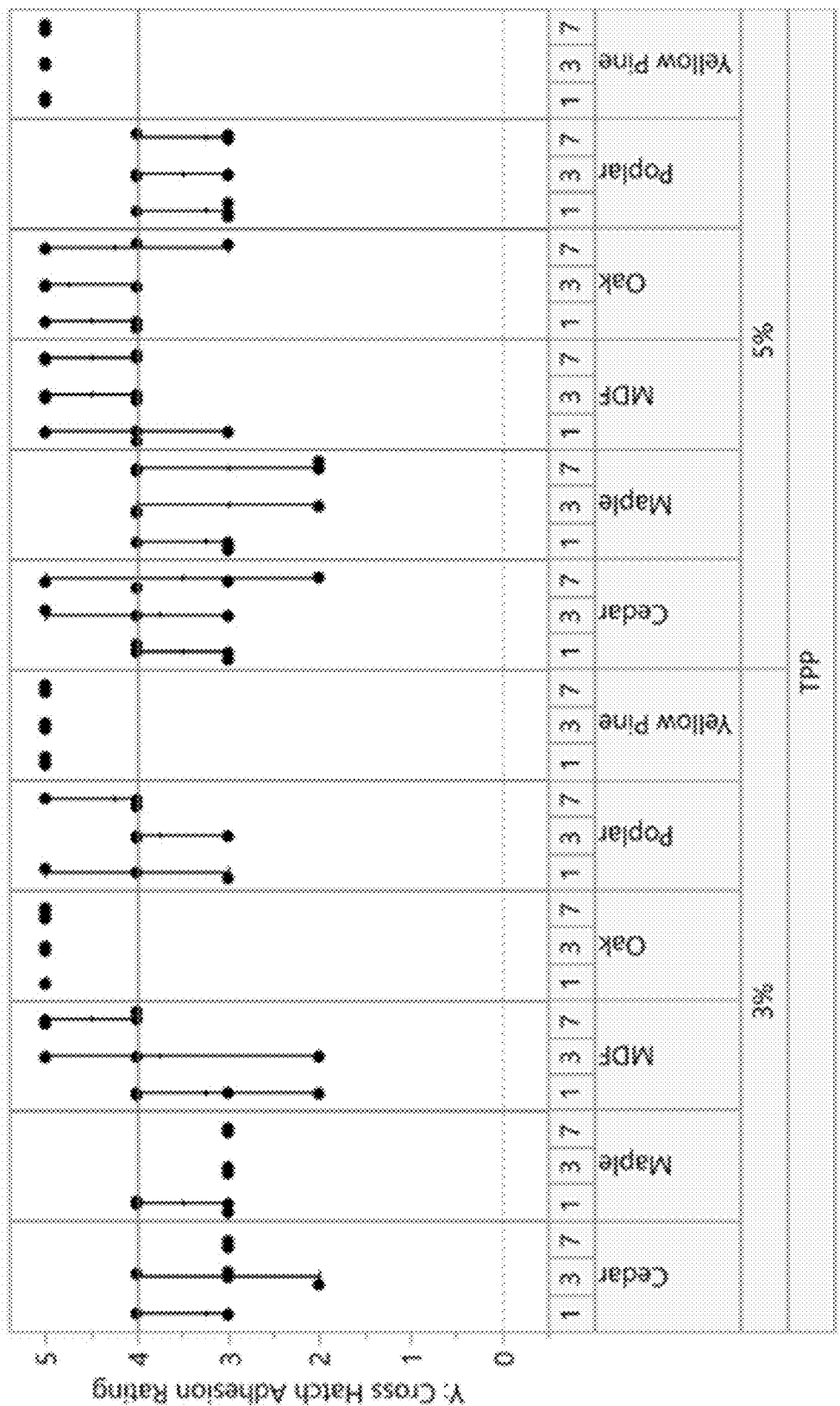

FIG. 8A illustrates the adhesion characteristics for the coating formulated with the triphenylphosphine catalyst on different bare wood substrates. FIG. 8B illustrates the adhesion characteristics for the coating formulated with the blocked tetrabutylammonium blend catalyst on different wood substrates. In each figure, the Y-axis reports the ASTM D3359 Method B rating. The X-axis reports the type of catalyst in the bottom-most row, the concentration of catalyst in the second row, the type of wood substrate in the third row, and the length of curing in the fourth row.

Figure 9:
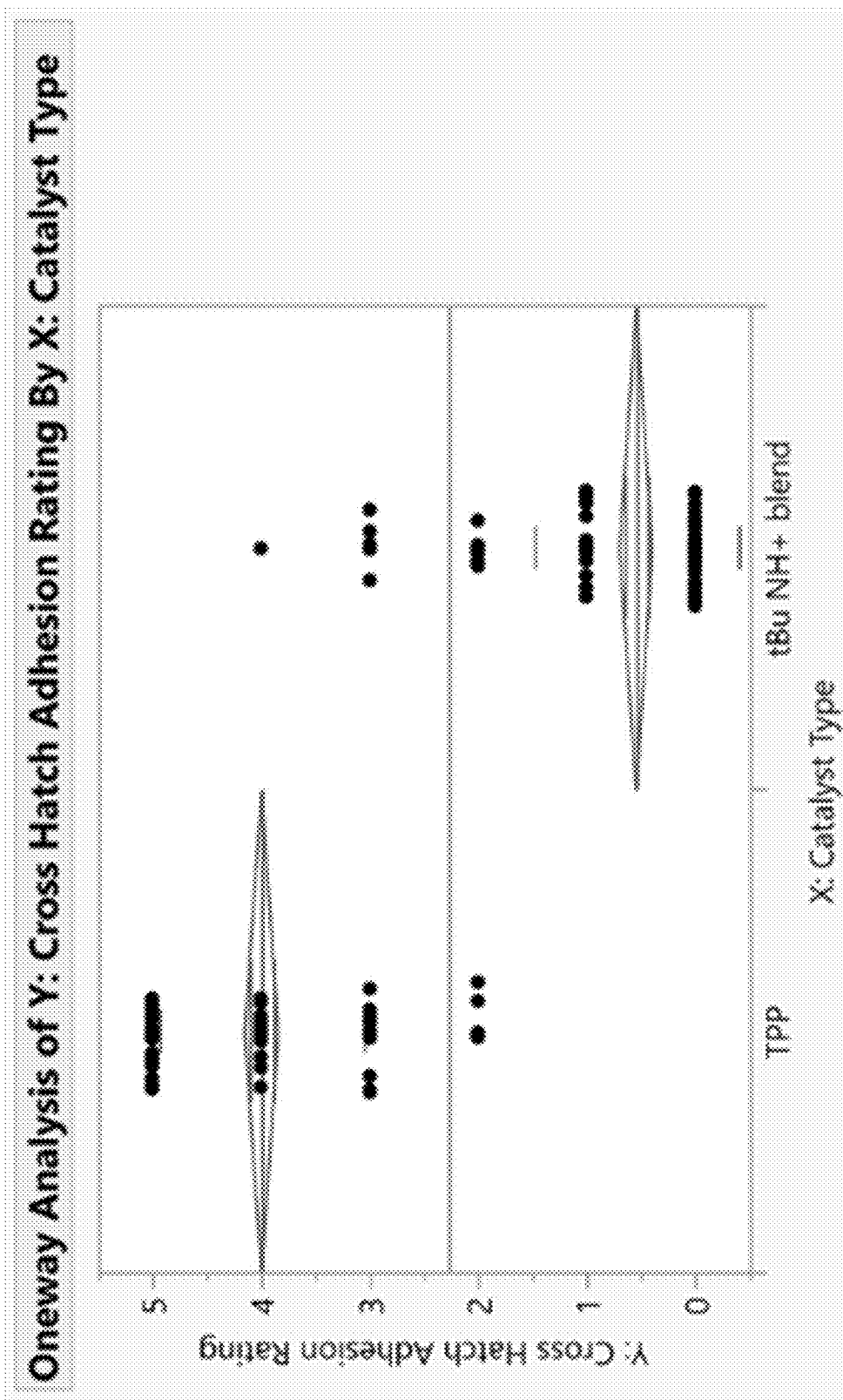
FIG. 9 is a plot illustrating aggregated adhesion values for all the samples reported in FIGS. 8A and 8B.
Figure 10A:
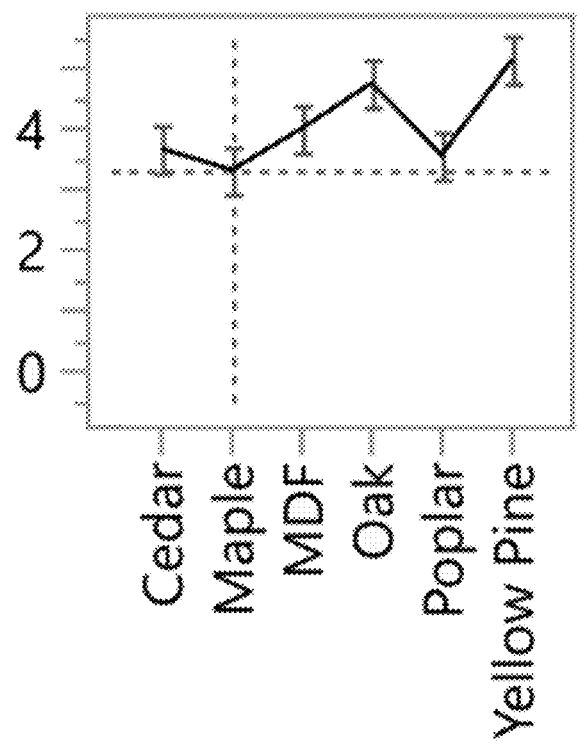
FIGS. 10A and 10B are plots of experimental data provided in FIG. 8A showing adhesion characteristics by type of wood substrate and catalyst concentration level, respectively.
Figure 10B:
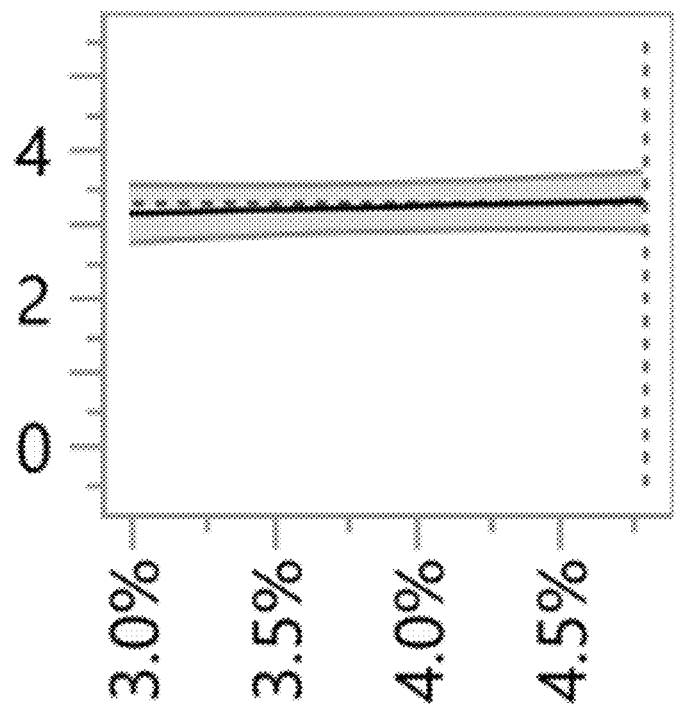
Figure 11A:
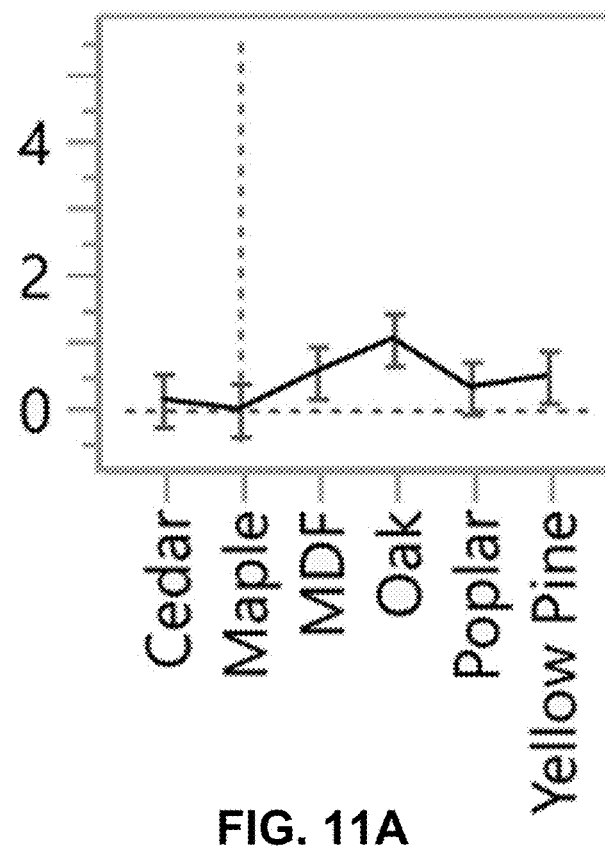
FIGS. 11A and 11B are plots of experimental data provided in FIG. 8B showing adhesion characteristics by type of wood substrate and catalyst concentration level, respectively.
Figure 11B:
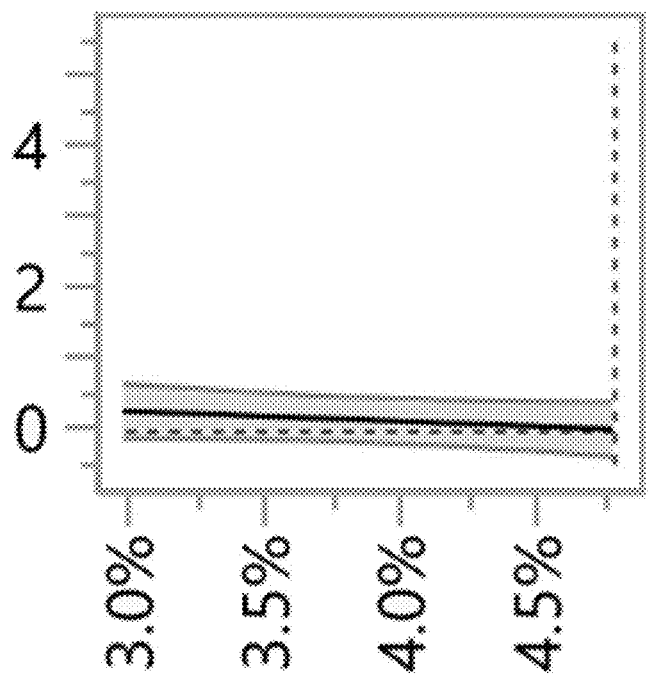

FIG. 9 is a plot illustrating aggregated adhesion values for all the samples reported in FIGS. 8A and 8B, with values for the two different catalysts studied presented in different columns. FIG. 10A illustrates the average adhesion value for the coatings formulated with the triphenylphosphine catalyst and reported in FIG. 8A according to the type of wood substrate. FIG. 10B illustrates the average adhesion value for the coatings formulated with the triphenylphosphine catalyst and reported in FIG. 8A according to catalyst concentration. FIG. 11A illustrates the average adhesion value for the coatings formulated with the blocked tetrabutylammonium blend catalyst and reported in FIG. 8B according to the type of wood substrate. FIG. 11B illustrates the average adhesion value for the coatings formulated with the blocked tetrabutylammonium blend catalyst and reported in FIG. 8B according to catalyst concentration.

The data show the substantially superior adhesion performance of the coatings formulated with the triphenylphosphine catalyst to wood substrates. The coatings formulated with the triphenylphosphine catalyst exhibited good adhesion over all substrates at both catalyst levels studied. The data also showed that the level of catalyst did not materially change the coating's adhesion performance.

The invention claimed is:

1. A curable resin composition comprising:
 (a) at least one component comprising two or more active methylene groups and/or active methine groups;
 (b) at least one component comprising at least two α, β-unsaturated carbonyl groups; and
 (c) from 0.5 weight percent to 7.5 weight percent of a triphenylphosphine catalyst that promotes a Michael reaction between said components (a) and (b);
 wherein the composition cures under ambient conditions; and
 wherein the composition exhibits a viscosity substantially similar to the viscosity of one or more of (a) or (b) for a period of at least 15 minutes.

2. The composition of claim 1, wherein, when the composition is applied to a ferrous metal substrate and cured to form a coating, the coating exhibits an adhesion according to ASTM D3359 Method B of at least 4.0.

3. The composition of claim 2, wherein, when the composition is applied to the ferrous metal substrate and cured to form the coating, the coating exhibits a pencil hardness according to ASTM D3363 of at least 7.0.

4. The composition of claim 1, wherein the at least one component comprising at least two α, β-unsaturated carbonyl groups comprises an acrylate resin.

5. The composition of claim 1, wherein the at least one component comprising at least two α, β-unsaturated carbonyl groups comprises at least one of a polyol poly(meth)acrylate, an unsaturated polyester resin, a polyester acrylate resin, an epoxy acrylate resin, a urethane acrylate resin, an α,β-unsaturated carbonyl group-containing acrylic resin, and a polyether acrylate resin.

6. The composition of claim 1, wherein the at least one component comprising two or more active methylene groups and/or active methine groups comprises a polyester resin obtained by polycondensation of a polyol with at least one of a malonic acid and a malonate ester.

7. The composition of claim 1, wherein the at least one component comprising two or more active methylene groups and/or active methine groups comprises a malonated polyester resin.

8. The composition of claim 1, wherein:
 the at least one component comprising two or more active methylene groups and/or active methine groups ranges from 5 weight percent to 30 weight percent of the composition;
 the at least one component comprising at least two α, β-unsaturated carbonyl groups ranges from 10 weight percent to 40 weight percent of the composition; and
 the triphenylphosphine catalyst ranges from 1 weight percent to 5 weight percent of the composition.

9. The composition of claim 8, wherein the composition contains a lesser amount of the at least one component comprising at least two α, β-unsaturated carbonyl groups than the at least one component comprising two or more active methylene groups and/or active methine groups.

10. The composition of claim 8, wherein:
 the at least one component comprising two or more active methylene groups and/or active methine groups ranges from 15 weight percent to 20 weight percent of the composition;
 the at least one component comprising at least two α, β-unsaturated carbonyl groups ranges from 20 weight percent to 30 weight percent of the composition; and
 the triphenylphosphine catalyst ranges from 2 weight percent to 4 weight percent of the composition.

11. The composition of claim 1, wherein the composition exhibits a viscosity substantially similar to the viscosity of one or more of (a) or (b) for a period of at least 1 hour.

12. The composition of claim 1, further comprising:
 (d) an alcohol.

13. A method of coating a substrate comprising:
 mixing a curable resin composition comprising (a) at least one component comprising two or more active methylene groups and/or active methine groups, (b) at least one component comprising at least two α, β-unsaturated carbonyl groups, and (c) from 0.5 weight percent to 7.5 weight percent of a triphenylphosphine catalyst, thereby promoting a Michael reaction between the at least one component comprising two or more active methylene groups and/or active methine groups and the at least one component comprising at least two α, β-unsaturated carbonyl groups;
 applying the curable resin composition to a substrate,
 wherein the curable resin composition cures at ambient conditions; and
 wherein the curable resin composition exhibits a viscosity substantially similar to the viscosity of one or more of (a) or (b) for a period of at least 15 minutes.

14. The method of claim 13, wherein the at least one component comprising at least two α, β-unsaturated carbonyl groups comprises an acrylate resin.

15. The method of claim 13, wherein the at least one component comprising at least two α, β-unsaturated carbonyl groups comprises at least one of a polyol poly(meth)acrylate, an unsaturated polyester resin, a polyester acrylate resin, an epoxy acrylate resin, a urethane acrylate resin, an α,β-unsaturated carbonyl group-containing acrylic resin, and a polyether acrylate resin.

16. The method of claim 13, wherein the at least one component comprising two or more active methylene groups and/or active methine groups comprises a polyester resin obtained by polycondensation of a polyol with at least one of a malonic acid and a malonate ester.

17. The method of claim 13, wherein the at least one component comprising two or more active methylene groups and/or active methine groups comprises a malonated polyester resin.

18. The method of claim 13, wherein the substrate is a metal substrate.

19. The method of claim 18, wherein the metal substrate comprises a ferrous metal substrate.

20. The method of claim 19, further comprising curing the curable resin composition on the ferrous metal substrate to form a coating, wherein the coating exhibits an adhesion according to ASTM D3359 Method B of at least 4.0.

21. The method of claim 20, wherein the coating exhibits a pencil hardness according to ASTM D3363 of at least 7.0.

22. The method of claim 18, wherein the metal substrate comprises a cylindrical tank.

23. The method of claim 13, wherein the substrate is a wood substrate.

24. The method of claim 13, wherein the at least one component comprising two or more active methylene groups and/or active methine groups and the at least one component comprising at least two α, β-unsaturated carbonyl groups are in a first container and the triphenylphosphine catalyst is in a second container, and mixing the curable resin composition comprises combining contents of the first container and the second container.

* * * * *